US010021868B2

(12) United States Patent
Edwards

(10) Patent No.: US 10,021,868 B2
(45) Date of Patent: Jul. 17, 2018

(54) METHOD FOR FORMING CUSTOM HORSE HOOF BOOT

(71) Applicant: Michael Edwards, Gainesville, FL (US)

(72) Inventor: Michael Edwards, Gainesville, FL (US)

( * ) Notice: Subject to any disclaimer, the term of this patent is extended or adjusted under 35 U.S.C. 154(b) by 138 days.

(21) Appl. No.: 15/236,758

(22) Filed: Aug. 15, 2016

(65) Prior Publication Data

US 2018/0042210 A1    Feb. 15, 2018

(51) Int. Cl.
*A01L 3/02* (2006.01)
*A01K 13/00* (2006.01)

(52) U.S. Cl.
CPC .............. *A01L 3/02* (2013.01); *A01K 13/007* (2013.01)

(58) Field of Classification Search
CPC . A01K 13/007; A01L 3/00; A01L 3/02; A01L 3/04
See application file for complete search history.

(56) References Cited

U.S. PATENT DOCUMENTS

| 4,237,981 | A | * | 12/1980 | Stubbe | ...................... | A01L 3/00 168/4 |
| 4,981,010 | A | * | 1/1991 | Orza | ..................... | A01K 13/007 168/18 |
| 7,685,801 | B2 | | 3/2010 | Brisson | | |
| 2007/0107389 | A1 | | 5/2007 | Ruetenik | | |
| 2017/0258066 | A1 | * | 9/2017 | Stevenson | ................. | A01L 3/00 |

FOREIGN PATENT DOCUMENTS

| DE | 102015010607 A1 | * | 2/2017 | ............... A01L 1/00 |
| FR | 2570251 A1 | * | 3/1986 | ............... A01L 3/00 |

OTHER PUBLICATIONS 3D printed horseshoe to improve racing performance; http://www.csiro.au/en/News/News-releases/2013/3D-printed-horseshoe-to-improve-racing-performance, accessed Mar. 1, 2018; published Oct. 17, 2013 (Year: 2013).*
Fran Jurga, The Hoof Blog, 3-D Printing in the Forge and Clinic: Hoof Anatomy models, Veterinary Applications, and Horseshoes; https://hoofcare.blogspot.com/2013/10/3-d-printing-in-forge-and-clinic-hoof.html, accessed Mar. 1, 2018; published Oct. 27, 2013. (Year: 2013).*
Daisy Bicking; PHCP Conference 2016: Packed Full of Gold; https://blog.easycareinc.com/blog/horse-hoofs/page/13; accessed Mar. 1, 2018; published Apr. 1, 2016. (Year: 2016).*

* cited by examiner

*Primary Examiner* — Daniel J Colilla
(74) *Attorney, Agent, or Firm* — Sven W. Hanson

(57) ABSTRACT

A novel horse hoof boot is provided with a method of forming the same. The boot includes two separate elements, the first configured in part to support the horse's hoof inside the boundary of the hoof wall and the second wrapping around the outside of the hoof to provide stability. The method enables custom forming of a boot to a particular horse's hoof by forming a three-dimensional rigid hoof model which guides formation of the boot components.

3 Claims, 6 Drawing Sheets

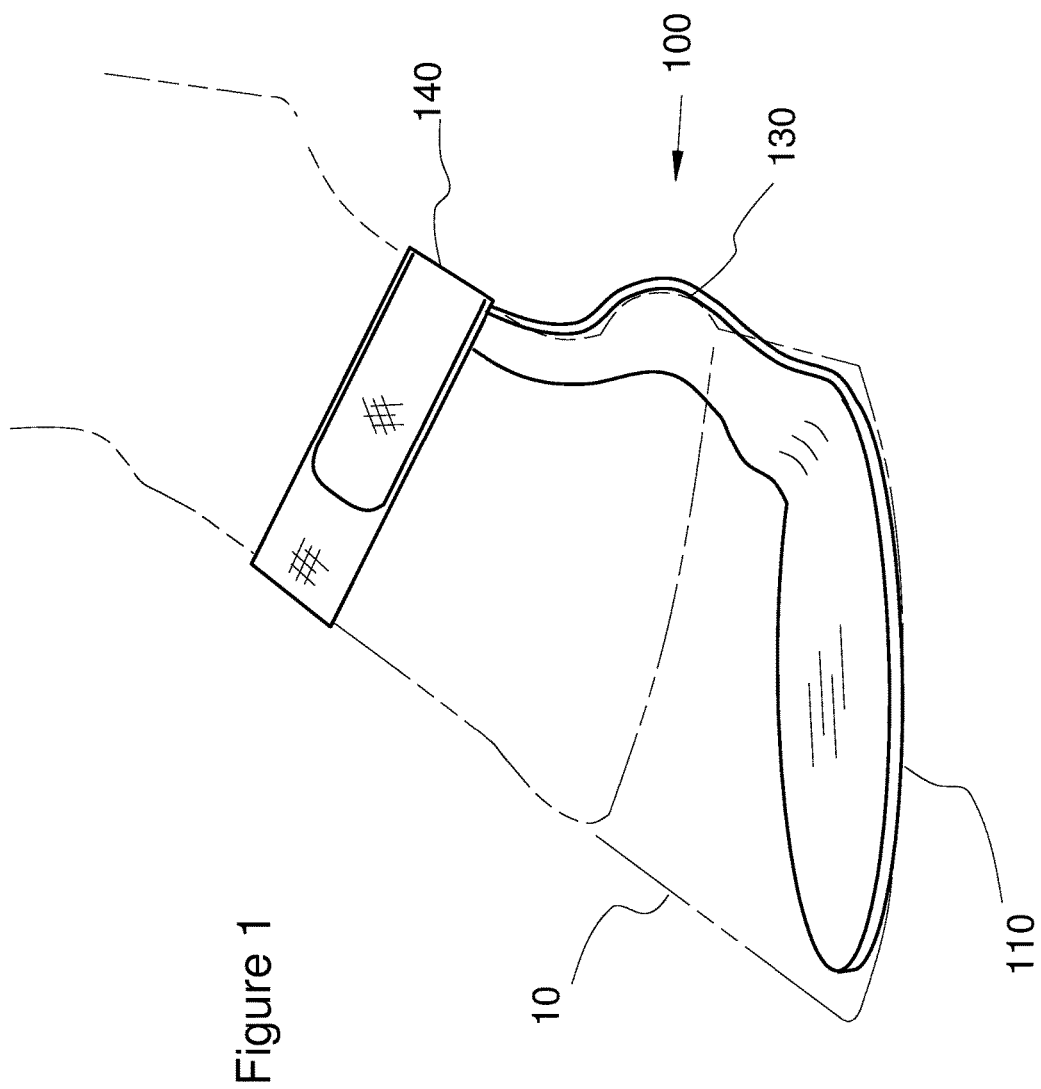

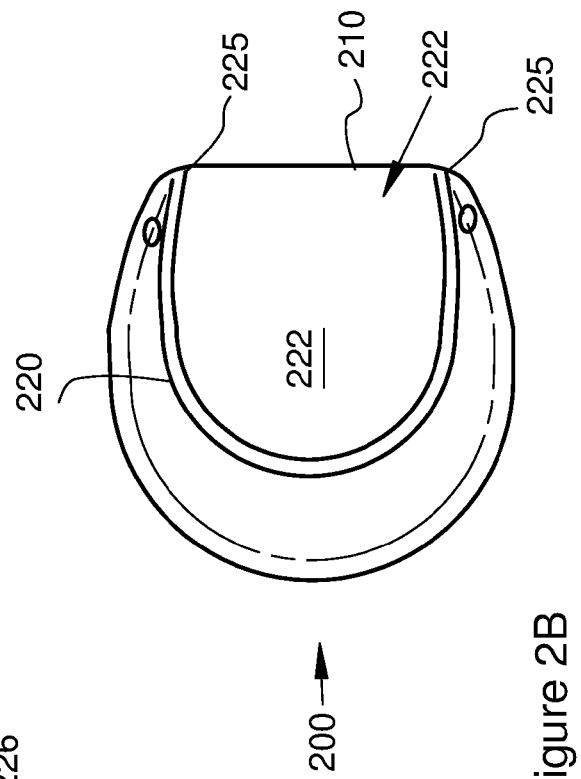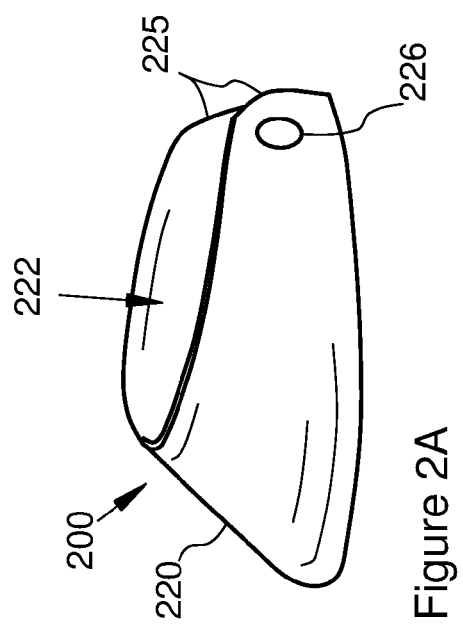

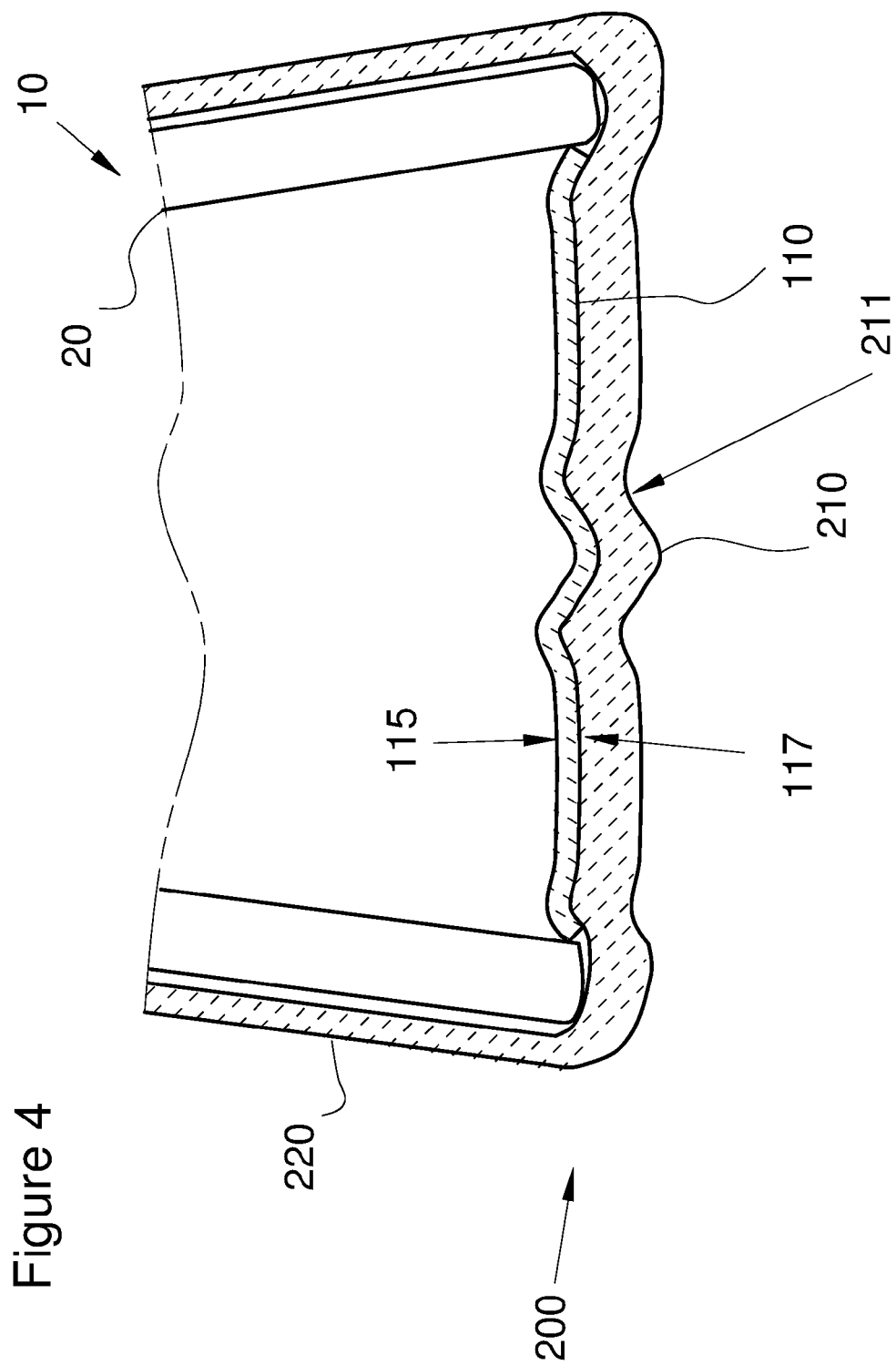

METHOD FOR FORMING CUSTOM HORSE HOOF BOOT

BACKGROUND

The present invention pertains to custom boots for protecting horse hooves and also serving as wear elements supporting the horse weight as transmitted through the walls of the hoof.

The prior art includes many variations of horse "shoes" that are intended to be secured by fasteners that penetrate the horse hoof wall. This mode of "shoeing" induces many problems to the hoof and to the horse health. The prior art also includes various boots that surround the hoof and also provide a weight-bearing element under the hoof. However, for a number of reasons these do not function well, in particular because they are not stable on the horse's hoof and are inclined to become loose. None of these devices provide methods of fitting to a horse hoof in an exacting or custom manner.

What is desired is horse footwear that is securely attached without penetrating fasteners. As well a method of construction is needed that accurately accommodate the geometry of individual hooves.

SUMMARY OF THE INVENTION

A novel horse hoof boot is provided with a method of forming the same. The invention boot includes two separate elements, a boot sole that conforms to the horse anatomy existing on the bottom of the hoof, within the hoof wall, and a boot body that surrounds the hoof wall and extends under the hoof to bear the weight of the horse through the hoof wall. The boot sole is received within the boot body and is captured between the horse hoof and a bottom plate of the boot body. In preferred embodiments, the boot sole includes a portion that extends upward to be secured to the leg of the horse. The conforming nature of the inventive boot is critical to the secure retention of the boot on the horse and proper anatomical response of the horse hoof and leg to movement activities.

Because each horse's respective anatomy is different and each and every hoof is also individually unique and different, construction of the present inventive boot requires exacting methods. In an inventive method of construction, a solid replica of a subject hoof is formed. This may be accomplished in the conventional location of residence of horses. This unique aspect of "in situ" forming of a replica allows for beneficial spacial and temporal separation of the events involving the living horse and the events of formation of the inventive body elements. From the solid replica, digital electronic data defining or describing the hoof is obtained or created. This may be through any of a number of known techniques such as optical scanning. The data defining or describing the hoof may form or embody an electronic digital model of the hoof. Elements of the inventive boot are then constructed using the electronic data by forming electronic models or similar data describing or defining boot elements that accommodate the electronic hoof model. Physical construction of the individual boot elements is preferably through application of the electronic data to additive formation systems such as three-dimensional printing systems. The individual boot element are then combined or assembled and additional construction steps may be required, such as addition of conventional padding features.

In further inventive aspects, incremental boot "sizes" may be formed from the digital data, each size boot varying in geometry to accommodate growth or wear changes in the hoof.

The following description of specific embodiments of the invention and accompanying drawing figures provide further details of the inventive device and method. The scope of the invention is defined by the provided claims which may encompass embodiments and elements not expressly disclosed but that are obvious extensions of the invention as disclosed.

DESCRIPTION OF THE DRAWINGS

FIGS. 1, 2A and 2B are illustrations of elements of one configuration of a horse boot according to the invention.

FIG. 4 is a cross section view of the inventive boot element of FIG. 2B.

DETAILS OF EMBODIMENTS OF THE INVENTION

Boots following the inventive design herein are preferably formed for and used with a particular horse and particular hooves. Herein, references to a "hoof" and parts thereof are used to indicate that portion of a horse anatomy generally, and at times also, a specific horse's anatomy. It should be understood that sizes and even specific shapes of elements of the inventive boot may be altered within the scope of the invention to accommodate the infinitely variable sizes and configurations of hooves. For convenience herein, the term "sole" when applied to features of a horse anatomy will be used to refer generally to the bottom-most features of the horse hoof, those apparent within the bounds of the hoof wall, including the sole and frog.

Terms of relative location and direction, such as "bottom" and "rear" refer generally to the normal application of these terms when used respecting a horse anatomy.

Figure 3:
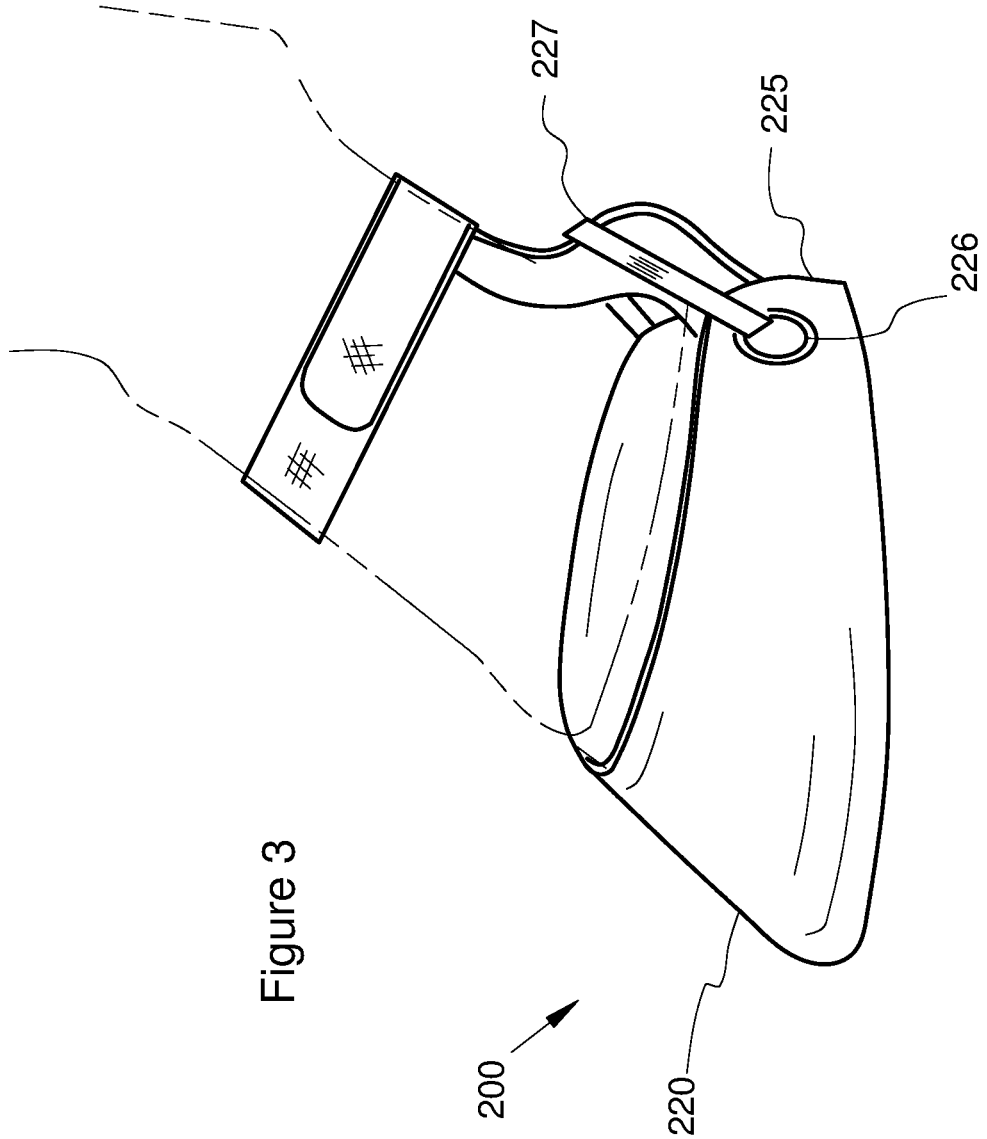
FIG. 3 is a perspective view of a preferred embodiment of the assembled elements of the inventive boot.

FIGS. 1, 2A and 2B illustrate elements of one common embodiment of the inventive boot. FIG. 3 illustrates an assembled inventive boot. The inventive boot includes two principal portions: a foundation 100 and a separate boot body 200. The general function of the boot body 200 is to bear the weight of the subject horse as transmitted through the horse's hoof and wall thereof while also protecting the hoof from unwanted contact and damage from the ground and other objects. The general function of the foundation 100 is to stabilize and help locate the boot body 200 on the hoof in use while protecting the hoof sole and heel bulb region of the hoof itself.

The critical element of the foundation 100 is a sole pad 110 which is sized and configured to be located and retained under the sole of the subject horse hoof, within the hoof wall. The sole pad 110 is relatively thin and generally circular in shape with a surface contour that follows the contours of the underside of horse hoof, including, for example the sole. The sole pad 110 is preferably uniform in thickness so that while the top surface 115 of the sole pad 110 follows the contour of the hoof sole, the bottom surface 117 has the same contour.

The sole pad 110 preferably has a thickness, from the top surface 115 to the bottom surface 117 of about ⅛ inch (3.2 millimeter). The outer perimeter of the sole pad 110 should follow the inner border of the hoof lamina, slightly separated from the inner border of the hoof wall.

From the rear of the sole pad 110, the foundation 100 includes a heel cup 130 that extends rearward and upward from the rearward extent of the sole pad 100. Preferably, the heel cup 130 is configured to substantially cover, and preferably conform to, the horse's hoof heel bulb.

The heel cup 130 extends upward from the sole pad 110 to have a length sufficient to reach a location just below the horse leg fetlock joint. The heel cup 130 terminates with a securing strap 140 configured to encircle the horse pastern at this point. The function of the strap 140 is to secure and retain in place the heel cup 130 and hence also the sole pad 110. The strap 140 should include open ends that may encircle the horse leg and interconnect to secure the ends together. The device or means of interconnection may include any of a number of conventional devices and means.

All elements of the foundation 100 should be formed of flexible resilient materials appropriate for protecting against contact injury to the horse. Appropriate materials will also be strong enough to enable the function of securing the sole pad 110. Suggested materials include urethane rubber and silicone rubber. Other materials providing similar characteristics and properties may also be used.

The boot body 200 in general is intended to extend substantially under the underside of the hoof and also wrap around the outside of the hoof wall below the periople. The bottom portions, specifically those portions on which the hoof wall bears and is supported, are configured to support the horse weight and provide a wear surface for the horse's movement activities. The surrounding portions of the boot body 200 are intended to both retain and stabilize the boot body 200 on the hoof and protect the hoof from incidental contact damage.

The boot body 200 includes a bottom plate 210, including portions that, as discussed above, are located under the hoof wall. The bottom plate 210 extends under substantially the entire hoof and contacts the sole pad over the entire bottom surface 117, thereby capturing the sole pad 110 against the bottom of the hoof. The bottom plate 210 preferably has a uniform thinness such that its bottom surface 211 follows, and contains the same profile of, the contour of the horse sole and like features. This outer (under) surface shape of the boot body 200 is important to maintain the contact and lateral resistance to movement against the ground in use that is required of the hoof for stable locomotion of the horse. The cross-section view of FIG. 4 is representative generally of the form of the bottom plate 210 and sole pad 110. Due to the complex shape of the underside surface (sole and frog) of a horse's hoof, the cross section shape of boot elements may vary depending on the location of the cross-section.

From the perimeter of the bottom plate 210, a boot wall 220 extends generally upward to follow the outer surface of the hoof wall. The boot wall 220 is open at the back of the boot body 200, at the sides of the hoof heel bulb. The boot wall 220 terminates there at both sides with a wall end portion 225. The specific form and upward extend of the boot wall 220 is not limited and may vary depending on the form of the associated hoof to be covered.

FIG. 3 depicts the combination of the boot body 200 and the foundation 100. The cross-section view of FIG. 4 depicts the close-fitting form of the sole 110 and bottom plate 210 with respect to the hoof (located within the cavity 222). The conforming nature of the sole pad 110 to the hoof and the bottom plate 210 to the sole pad 110 is critical to ensure resistance to lateral forces during movement activities by the associated horse.

A closure device or mechanism is provided to bias the two end portions 225 together, or similarly secure them in place, to capture the boot on the horse hoof during use. In the configuration shown in FIG. 3, the closure device consists of a respective aperture 226 in each wall end portion 225 together with a resilient cord 227 interconnecting the two apertures 226. The cord 227 may be provided by any of a variety of existing flexible elongated elements such as leather, woven strapping, rope, fabric or other like materials and device. It should be clear that other closure devices or mechanisms may be used for the same effect and function. Likewise the boot wall 220 or end portions 225 may have different alternative configurations providing the same function and effect specified here.

Because the boot body 200, and particularly the bottom plate 210 must resist substantial forces and wear, these components are formed of materials both strong and tough and wear resistant. At the same time, due to the hoof geometry, the boot body walls 220 should be flexible enough to allow entry of the hoof into the boot body 200. Where manufacturing methods allow, it may be preferred to form the bottom plate 210 of a distinct material from the other portions of the boot body 200, whereby a more rigid material may be used for the bottom plate 210.

While the various elements of the boot body 200 have been described as distinct physical elements, no boundary or separation or physical distinction between them is necessary or desired. In preferred embodiments, the boot body is formed substantially of a unitary one-piece construction.

Because each horse's anatomy is different and each and every hoof is also individually unique and different, construction of the present inventive boot must be exacting. The "fit" of the boot must be exact, with the foundation sole pad 110 substantially matching the entire underside surface of the hoof with little gap between it and the hoof wall. The boot body 200 must conform tightly to the outside of the hoof wall. Failure in either of these requirements is likely to result in a loose fitting boot that will not remain in place during use and potentially damage the horse. In addition, because a hoof is a living thing with geometry that changes with time, in practice multiple different sets of boots are preferably provided for any particular horse.

The previously described boot elements may be formed using any of a variety of materials and methods of construction. However, the following is a preferred method providing particularly sought benefits and advantages in the current state of the associated industry and technology. In particular, electronic means of measurement and reproduction discussed are essential to enabling the three-dimensional fit of the boot body 200 with the foundation sole pad 110.

In the inventive method of constructing the inventive hoof boot, a physical model of the hoof is formed. The purpose of this step is to separate and isolate the associated horse and the subject hoof, and their usual equine environment, from the remaining steps and associated equipment employed which require an environment inevitably incompatible with equine environments. The physical model is then used to create digital electronic data defining the actual hoof geometry. This may be accomplished by, for example, optical scanning methods. The digital electronic data is then applied, with the use of fabrication methods and devices that are capable of forming three-dimensional unitary objects (such as so called 3D printers), to construct one or more of the elements of the inventive hoof boot. Remaining elements, or construction features (such as the resilient cord 227), may require formation or provision by conventional methods to arrive at a finished boot configuration.

Figure 5B:
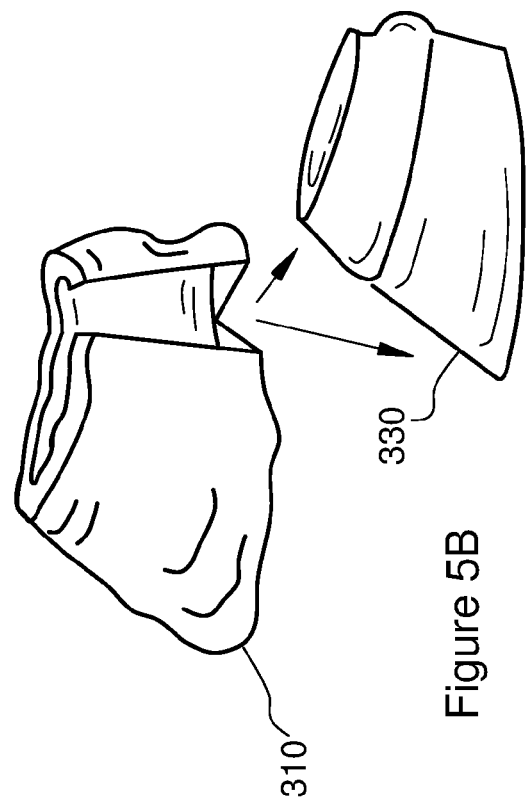
FIGS. 5A, 5B, and 6 are illustrations of steps in the inventive method of forming the inventive horse boot.
Figure 5A:
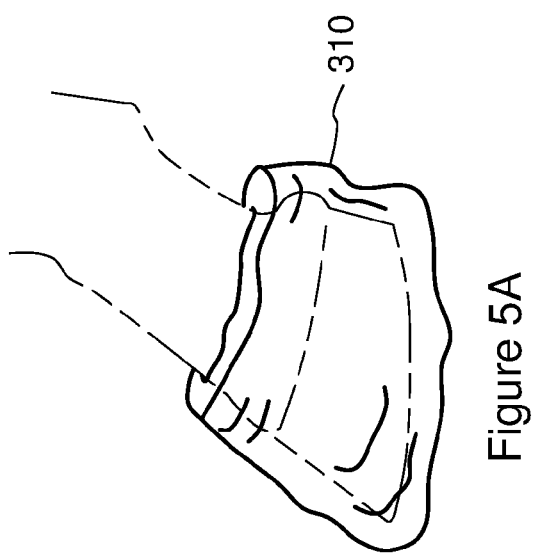
Figure 6:
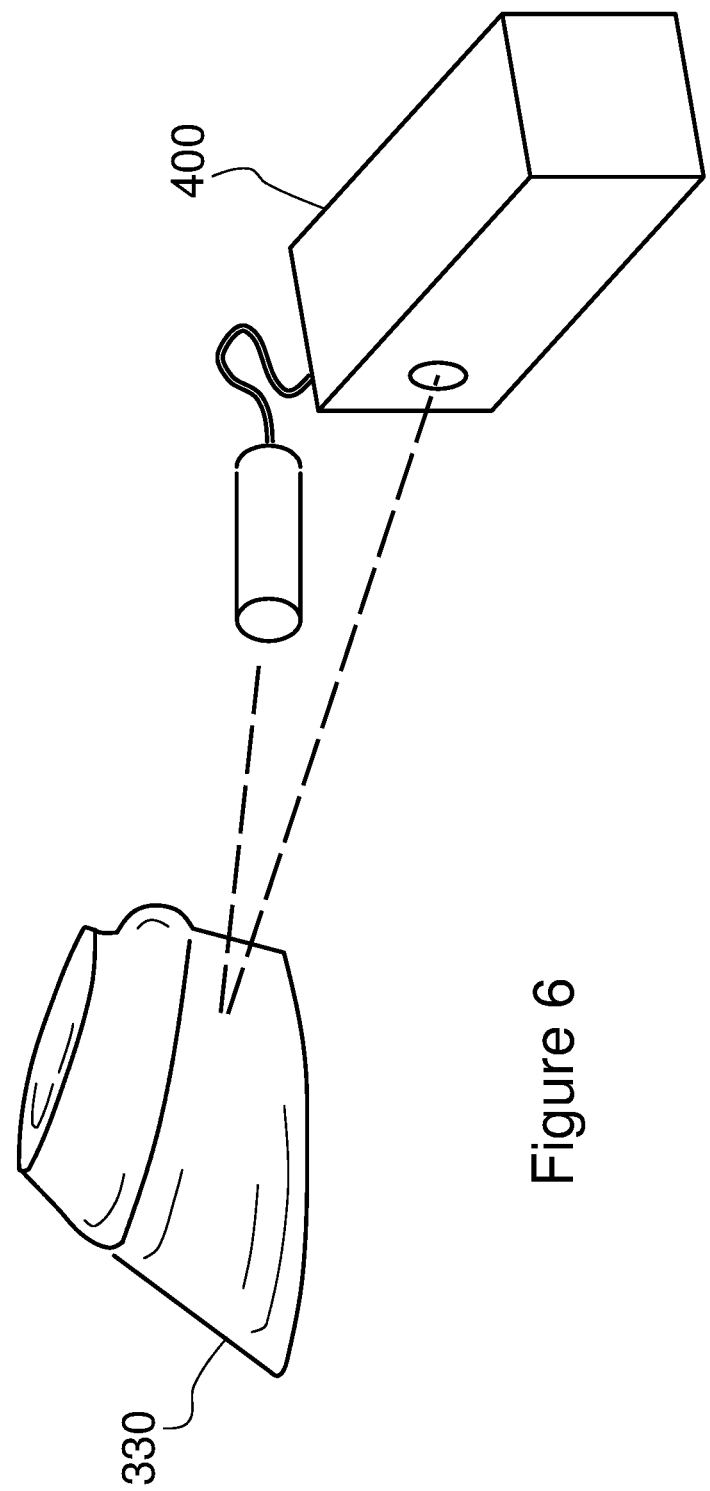

FIGS. 5A, 5B and 6 illustrate various steps in an inventive method of forming elements of the inventive boot. In a first step, a female model of the subject horse hoof is formed. This may be accomplished by application of any of a number of materials known for the task. For example, a silicone based RTV rubber in liquid or putty form may be used. The semi-liquid or putty mold material may be applied directly to the hoof, or an enclosure used to surround the hoof and contain a similar liquid mold material. The hoof should be prepared prior to molding to remove foreign objects and dirt and generally put the hoof into a condition equal to one that would be appropriate for fitting a boot for use. FIG. 5A illustrates a hoof with a surrounding mold body 310 according to this process. The mold body 310 should encompass the entire wall and bottom of the hoof and extend upward at least to the top of the hoof wall. After curing, the mold body may be split to be removed.

An advantage of the current inventive method is that the above step may be accomplished in a horse stable or any other typical resting location of a horse—without transporting the horse to any other location. The above step is also easily carried out by persons with little technical knowledge and no knowledge of the remaining activities and requirements of the current method. Other methods and devices for forming a female mold body may be employed for the same result and effect.

The female mold body 310 is then used to construct a hoof replica 330 as illustrated in FIG. 5B using conventional model making techniques. The figure depicts the removal of the replica 330 from an opened mold body 310. The hoof replica 330 should be formed of a stable and rigid material that is compatible with the intended digitalizing methods.

The hoof replica 330 is the source of a hoof model in the form of digital electronic data defining the geometry of a hoof for which an inventive boot is to be constructed. In one example of the method of creating this digital electronic data a laser three-dimensional scanner is applied to create a digital model of the hoof. FIG. 6 illustrates one example of creating the digital data and model. A digital optical scanning system 400 projects a laser light beam onto the surface of the hoof replica 330 and receives the reflected light. Characteristics of the reflected light are used to determine the geometry of the replica 330 in the form of digital electronic data. Other methods of creating the digital electronic data may be used such as contact 3D scanners. The manner of generating the digital data is not critical and various existing and future methods may be employed for the same result.

The above created digital electronic data is applied or used as input or control for an automated fabrication device such as an additive manufacturing system or 3D printer to form one or more of the boot elements (foundation, boot body). The nature and form of useful model or digital electronic data is dependent on the nature of the system used to construct the boot elements. While the digital data provides information defining the physical bounds of the hoof itself, additional data and knowledge defining the geometry, bounds and volume of each created element of the inventive boot also will be required. Provision of such additional data will follow conventional practices for the systems employed, following the requirements and specification of the inventive constructions herein. Specific general boot designs may be defined through stored electronic data sets and machine executable software specifically designed to control a fabrication device, while providing for input of hoof geometry data to define specific boot elements.

The inventive method may include forming additional boot construction elements or features by other methods, including conventional forming methods such as manually. One example of this is the manual addition, by manual stitching or gluing, of strapping or padding elements that may be added to the boot foundation 100 or boot body 200.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to elements in the singular, for example, using the articles "a," "an," "the" or "said," is not to be construed as limiting the element to the singular.

The invention claimed is:

1. A method of forming a custom boot for a horse hoof, comprising:
   identifying a horse hoof with a hoof wall and hoof sole;
   forming a replica of the hoof;
   forming a flexible boot sole that conforms to the shape of the replica hoof sole;
   forming a unitary boot body configured to surround the replica hoof wall wherein the boot body is formed with a bottom surface conforming to the shape of the hoof sole;
   combining the boot body and boot sole in a configuration securable on the horse hoof.

2. A horse boot for a horse hoof comprising:
   a flexible boot sole shaped to conform to the horse hoof sole;
   a securement extending from the boot sole and configured to encircle a portion of the leg of a horse above the hoof;
   a boot body comprising;
      a bottom plate conforming to the boot sole;
      a boot wall extending upward from the bottom plate and defining with the bottom plate a cavity configured to receive the hoof; and
   the boot sole disposed within the cavity against the bottom plate;
   such that the securement may encircle a horse leg above the hoof while the hoof is received in the cavity.

3. A horse boot, according to claim 2, and wherein:
   the securement comprises:
      a boot heel element extending from the boot sole;

a strap extending from the boot heel element, the strap configured to encircle a horse leg above the hoof; and the boot body further comprising a bottom surface conforming to the hoof sole.

\* \* \* \* \*